United States Patent
Ono et al.

(10) Patent No.: US 9,334,800 B2
(45) Date of Patent: May 10, 2016

(54) METHOD OF CONTROLLING TURBINE EQUIPMENT AND TURBINE EQUIPMENT

(75) Inventors: Hitoi Ono, Hyogo (JP); Takashi Sonoda, Hyogo (JP); Naoto Tochitani, Tokyo (JP); Makoto Kato, Hyogo (JP); Masahide Umaya, Tokyo (JP); Fuminori Fujii, Hyogo (JP)

(73) Assignees: MITSUBISHI HEAVY INDUSTRIES, LTD., Tokyo (JP); PEBBLE BED MODULAR REACTOR (PTY) LIMITED, Centurion (ZA)

( * ) Notice: Subject to any disclaimer, the term of this patent is extended or adjusted under 35 U.S.C. 154(b) by 1100 days.

(21) Appl. No.: 12/934,015

(22) PCT Filed: Mar. 27, 2009

(86) PCT No.: PCT/JP2009/056925
§ 371 (c)(1),
(2), (4) Date: Sep. 22, 2010

(87) PCT Pub. No.: WO2009/119916
PCT Pub. Date: Oct. 1, 2009

(65) Prior Publication Data
US 2011/0044794 A1    Feb. 24, 2011

(30) Foreign Application Priority Data

Mar. 28, 2008 (JP) ................................. 2008-088590

(51) Int. Cl.
*F01K 13/02* (2006.01)
*F02C 1/00* (2006.01)
(Continued)

(52) U.S. Cl.
CPC . *F02C 1/05* (2013.01); *F01K 13/02* (2013.01); *F01K 25/00* (2013.01); *F02C 1/10* (2013.01);
(Continued)

(58) Field of Classification Search
CPC ........... F01K 13/02; F01K 25/00; F02C 1/10; F02C 1/05; G21D 3/08
USPC ........ 60/644.1, 646, 657, 660, 661, 666, 650, 60/682–683, 659
See application file for complete search history.

(56) References Cited

U.S. PATENT DOCUMENTS 4,971,516 A * 11/1990 Lawless et al. .................... 415/1
7,028,481 B1    4/2006 Morrow
(Continued)

FOREIGN PATENT DOCUMENTS

EP    1719889 A1    11/2006
JP    50-22111 A    3/1975
(Continued)

OTHER PUBLICATIONS

English Language Translation of JP59206617.*
(Continued)

*Primary Examiner* — Kenneth Bomberg
*Assistant Examiner* — Wesley Harris
(74) *Attorney, Agent, or Firm* — Westerman, Hattori, Daniels & Adrian, LLP

(57) ABSTRACT

To provide a method of controlling a turbine equipment and a turbine equipment capable of carrying out a starting operation of controlling a load applied to a speed reducing portion while complying with a restriction imposed on an apparatus provided at a turbine equipment. The invention is characterized in including a speed accelerating step (S1) of increasing a revolution number by driving to rotate a compressing portion and a turbine portion by a motor by way of a speed reducing portion, a load detecting step (S2) of detecting a load applied to the speed reducing portion by a load detecting portion, and a bypass flow rate controlling step (S3) of increasing a flow rate of a working fluid bypassed from a delivery side to a suction side of the compressing portion when an absolute value of the detected load is equal to or smaller than an absolute value of a predetermined value and reducing the flow rate of the bypassed working fluid when equal to or larger than the absolute value of the predetermined value.

6 Claims, 11 Drawing Sheets

(51) Int. Cl.
*F01K 25/00* (2006.01)
*G21D 3/08* (2006.01)
*F02C 1/05* (2006.01)
*F02C 1/10* (2006.01)
*F02C 9/18* (2006.01)
*G21D 1/02* (2006.01)

(52) U.S. Cl.
CPC .. *F02C 9/18* (2013.01); *G21D 1/02* (2013.01); *G21D 3/08* (2013.01); *F05D 2260/85* (2013.01); *F05D 2270/30* (2013.01); *Y02E 30/40* (2013.01)

(56) References Cited

U.S. PATENT DOCUMENTS

| | | | |
|---|---|---|---|
| 7,603,860 B2 * | 10/2009 | Thomas | 60/650 |
| 7,685,819 B2 * | 3/2010 | Vetrovec | 60/611 |
| 2004/0131138 A1 | 7/2004 | Correia et al. | |

FOREIGN PATENT DOCUMENTS

| | | |
|---|---|---|
| JP | 51-71409 A | 6/1976 |
| JP | 59-206617 A | 11/1984 |
| JP | 6-159098 A | 6/1994 |
| JP | 7-063071 A | 3/1995 |
| JP | 08-068341 A | 3/1996 |
| JP | 3020853 B2 | 3/2000 |
| JP | 2000-154733 A | 6/2000 |
| JP | 2003-201864 A | 7/2003 |
| JP | 2003-336505 A | 11/2003 |
| JP | 2006-257925 A | 9/2006 |
| WO | 2007/024569 A2 | 3/2007 |

OTHER PUBLICATIONS

Chinese Office Action dated May 2, 2013, issued in corresponding Chinese Application No. 200980110550.6, w/English translation.
International Search Report of PCT/JP2009/056925, mailing date Mar. 18, 2011.
Written Opinion of the International Searching Authority dated Mar. 18, 2011, issued in corresponding International Application No. PCT/JP2009/056925.
Japanese Office Action dated Oct. 25, 2011, issued in corresponding Japanese Patent Application No. 2011-501451.(w/partial English translation).

* cited by examiner

METHOD OF CONTROLLING TURBINE EQUIPMENT AND TURBINE EQUIPMENT

TECHNICAL FIELD

The present invention relates to a method of controlling a turbine equipment and a turbine equipment, particularly relates to a method of controlling a turbine equipment and a turbine equipment preferably used in a closed cycle gas turbine for circulating a working fluid in a closed system by using an atomic reactor or the like for a heat source.

BACKGROUND ART

In accelerating a speed of a generator equipment of a gas turbine or the like of a background art, a motor provided exclusive for starting and electric apparatus SFC (Static Frequency Converter) for using a generator as a motor are used. The apparatus are used only in starting, and therefore, in order to achieve a reduction in plant cost, the apparatus having capacities as small as possible have been used.

Therefore, in a current state, a revolution number is increased up to 30% of a rated revolution number by using the apparatus exclusive for accelerating a speed, thereafter, fuel supply is started and the revolution number is increased by an acceleration torque of the turbine per se.

However, according to the closed cycle gas turbine of circulating the working fluid in the closed system by using the atomic reactor or the like for the heat source, a temperature elevating rate is restricted by a restriction imposed on a reactor main body (for example, 100° C./h) and rapid temperature elevation is difficult. Therefore, according to a starting method using a starting procedure similar to that of the gas turbine of the background art, a problem that time is taken for elevating the speed of the turbine to the rated revolution number is posed.

On the other hand, according to a method of elevating a speed up to a rated revolution number by using only a starting apparatus, a capacity required for the starting apparatus is increased, and therefore, a problem of increasing plant cost is posed.

As a method of resolving the above-described problem, a technology of operating an amount of filling helium circulated in a closed system has been proposed (refer to, for example, the Publication of Japanese Patent No. 3020853).

According to a technology described in the Publication of Japanese Patent No. 3020853, by reducing the amount of filling helium more than a filling amount in a rated operation in accelerating the speed of the turbine, a drive torque required for elevating the speed of the turbine can be reduced and a capacity required for the starting apparatus can be reduced.

However, according to the technology described in the Publication of Japanese Patent No. 3020853, time is taken in operating the helium filling amount, and therefore, a problem that the technology is not pertinent for being used in an acceleration operation which is finished in a comparatively short time period.

Further, according to a speed reduction gear or the like for transmitting a drive torque generated by a motor or the like to a turbo unit comprising a compressor and a turbine, a drawback of fretting or the like is prevented from being brought about by being loaded with a necessary minimum torque.

However, when the drive torque required for accelerating the speed of the turbine is reduced as described above, also a torque loaded to the reduction gear or the like is also reduced to pose a problem that there is a concern of bringing about a drawback of fretting or the like by deviating load sharing of the gear from a standard value by a self weight of the gear, or shifting a contact position of teeth from a standard position.

DISCLOSURE OF INVENTION

The invention has been carried out in order to resolve the above-described problem and it is an object thereof to provide a method of controlling a turbine equipment and a turbine equipment capable of carrying out a starting operation by controlling a load applied on a speed reducing portion while complying with a restriction imposed on an apparatus provided at a turbine equipment.

In order to achieve the above-described object, the invention provides a following means.

A method of controlling a turbine equipment of the invention is characterized by a method of controlling a turbine equipment including a compressing portion of compressing a working fluid, a turbine portion driven to rotate by the working fluid, and a circulating flow path of circulating the working fluid at least between the compressing portion and the turbine portion, the method including a speed accelerating step of increasing a revolution number by driving to rotate the compressing portion and the turbine portion by a motor by way of a speed reducing portion, a load detecting step of detecting a load applied to the speed reducing portion by a load detecting portion, and a bypass flow rate controlling step of increasing a flow rate of the working fluid bypassed from a delivery side to a suction side of the compressing portion when an absolute value of the detected load is equal to or smaller than an absolute value of a predetermined value and reducing the flow rate of the bypassed working fluid when the absolute of the load is equal to or larger than the absolute value of the predetermined value.

According to the invention, in operating to accelerate a speed of the compressing portion and the turbine portion, by controlling the flow rate of the working fluid bypassed from the delivery side to the suction side of the compressor based on the load applied to the speed reducing portion, the load applied to the speed reducing portion is controlled to the predetermined value.

For example, in comparison with the method of controlling the flow rate of the bypassed operating fluid based on a time period elapsed from starting to operate to accelerate the speed, a control of the load applied to the speed reducing portion becomes accurate.

That is, when the absolute value of the load applied to the speed reducing portion is equal to or smaller than the absolute value of the predetermined value, by an increase in the flow rate of the bypassed working fluid, the flow rate of the working fluid passing the compressor is increased. When the flow rate of the passing working fluid is increased, a torque necessary for driving the compressor is increased, and therefore, a load applied to the speed reducing portion arranged between the motor and the compressor is increased and the load applied to the speed reducing portion is controlled to the predetermined value.

On the other hand, when the absolute value of the load applied to the speed reducing portion is equal to or larger than the absolute value, by reducing the flow rate of the bypassed working fluid, the flow rate of the working fluid passing the compressor is reduced. When the flow rate of the passing working fluid is reduced, the torque necessary for driving the compressor is reduced, and therefore, the load applied to the speed reducing portion arranged between and the compressor is reduced, and the load applied to the speed reducing portion is controlled to the predetermined value.

Further, the load applied to the speed reducing portion is controlled by controlling only the flow rate of the bypassed working fluid, and therefore, even in a case of a turbine equipment provided with a heat source of restricting a temperature accelerating rate of, for example, an atomic reactor or the like of heating the working fluid, the load applied to the speed reducing portion can be controlled to the predetermined value while complying with a restriction of the temperature elevating rate or the like imposed on the heat source.

According to the invention, it is preferable that the bypass flow rate controlling step includes a first calculating step of calculating the bypassed flow rate based on the detected load and the predetermined value, a second calculating step of calculating a bypass flow rate necessary for preventing surging of the compressor from being brought about based on a pressure ratio between the suction side and the delivery side of the compressor, and a corrected revolution number of the compressor calculated based on a temperature of the working fluid sucked to the turbine portion, a selecting step of selecting the bypass flow rate having a larger flow rate from the bypass flow rates calculated by the first and the second calculating steps, and a flow rate controlling step of controlling the flow rate of the working fluid bypassed from the delivery side to the suction side of the compressing portion to the selected bypass flow rate.

According to the invention, the bypass flow rate having the larger flow rate is selected from the bypass flow rate of controlling the load applied to the speed reducing portion to the predetermined value and the bypass flow rate for preventing surging of the compressor from being brought about to be controlled to the bypass flow rate of selecting the flow rate of the bypassed working fluid, and therefore, not only the load applied to the speed reducing portion is prevented from being smaller than the predetermined value but surging of the compressor is prevented from being brought about.

A method of controlling a turbine equipment of the invention is characterized by a method of controlling a turbine equipment including a compressing portion of compressing a working fluid, a turbine portion driven to rotate by the working fluid, and a circulating flow path of circulating the working fluid at least between the compressing portion and the turbine portion, the method including a speed accelerating step of increasing a revolution number by driving to rotate the compressing portion and the turbine portion by a motor by way of a speed reducing portion, and a bypass flow rate controlling step of reducing a flow rate of the working fluid bypassed from the delivery side to the suction side of the compressing portion with an elapse of a time period after starting to increase a revolution number.

According to the invention, in operating to accelerate speed of the compressing portion and the turbine portion, by controlling the flow rate of the working fluid bypassed from the delivery side to the suction side of the compressor based on the elapsed time period after starting to operate to accelerate speed, the load applied to the speed reducing portion is controlled to the predetermined value.

For example, in comparison with the method of controlling the flow rate of the bypassed working fluid based on the load applied to the speed reducing portion, the control of the load applied to the speed reducing portion is facilitated.

That is, in starting to operate to accelerate speed, the temperature of the working fluid circulating through the compressing portion and the turbine portion is low, the torque necessary for driving the compressing portion or the like is small, and therefore, also the load applied to the speed reducing portion is small. Therefore, in starting to operate to accelerate speed, the flow rate of the working fluid passing through the compressor is ensured without reducing the flow rate of the bypassed working fluid and the load applied to the speed reducing portion is ensured.

Thereafter, when time has elapsed after starting to operate to accelerate the speed, the temperature of the working fluid circulating to the compressing portion and the turbine portion becomes high, the torque necessary for driving the compressing portion or the like is increased and the load applied to the speed reducing portion is increased.

Therefore, an increase in the torque necessary for driving the compressor is restrained and an increase in the load applied to the speed reducing portion is restrained by reducing the flow rate of the bypassed working fluid with an elapse of time after starting to operate to accelerate speed.

In the invention, it is preferable that the bypass flow rate control step includes a first calculating step of calculating the bypass flow rate based on the elapsed time period after starting to increase the revolution number, a second calculating step of calculating the bypass flow rate necessary for preventing surging of the compressor from being brought about based on a pressure ratio between the suction side and the delivery side of the compressor, and a corrected revolution number of the compressor calculated based on a temperature of the working fluid sucked to the compressor, a selecting step of selecting the bypass flow rate having a larger flow rate from the bypass flow rates calculated by the first and the second calculating steps, and a flow rate controlling step of controlling the flow rate of the working fluid bypassed from the delivery side to the suction side of the compressing portion to the selected bypass flow rate.

According to the invention, the bypass flow rate having the larger flow rate is selected from the bypass flow rate based on the elapsed time period after starting to increase the revolution number and the bypass flow rate for preventing surging of the compressor from being brought about to control to the bypass flow rate selecting the flow rate of the bypassed working fluid, and therefore, not only the load applied to the speed reducing portion is prevented from being smaller than the predetermined value and surging is prevented from being brought about at the compressor.

A turbine equipment of the invention is characterized in being provided with a compressing portion of compressing a working fluid, a turbine portion driven to rotate by the working fluid, a circulating flow path of circulating the working fluid at least between the compressing portion and the turbine portion, a bypass flow path of bypassing the working fluid from a delivery side to a suction side of the compressing portion, a flow rate control portion of controlling a flow rate of the working fluid flowing through the bypass flow path, a motor of driving to rotate the compressing portion and the turbine portion by way of a speed reducing portion in starting, and a control portion for executing the control method according to any one of Claim 1 through Claim 4.

According to the invention, by carrying out the controlling method of the invention by the control portion, the flow rate of the working fluid bypassed from the delivery side to the suction side of the compressor is controlled and the load applied to the speed reducing portion is controlled.

Further, the load applied to the speed reducing portion is controlled by controlling only the flow rate of the bypassed working fluid, and therefore, even in a case of a turbine equipment provided with a heat source restricting a temperature elevating rate of, for example, an atomic reactor or the like of heating the working fluid, the load applied to the speed reducing portion can be controlled to the predetermined value while complying with a restriction imposed on the heat source of the temperature elevating rate or the like.

According to the method of controlling the turbine equipment and the turbine equipment, in operating to accelerate speed of the compressing portion and the turbine portion, by controlling the flow rate of the working fluid bypassed from the delivery side to the suction side of the compressor based on the load applied to the speed reducing portion, there is achieved an effect of capable of carrying out a starting operation of controlling the load applied to the speed reducing portion while complying with the restriction imposed on the apparatus provided at the turbine equipment.

According to the method of controlling the turbine equipment and the turbine equipment of the invention, by controlling the flow rate of the working fluid bypassed from the delivery side to the suction side of the compressor based on the elapsed time period after starting to operate the accelerating of the speed in operating to accelerate speed of the compressing portion and the turbine portion, there is achieved an effect capable of carrying out the starting operation restricting the load applied to the speed reducing portion while complying with the restriction imposed on the apparatus provided at the turbine equipment.

BEST MODE FOR CARRYING OUT THE INVENTION

First Embodiment

A power generating equipment including a closed cycle gas turbine according to a first embodiment of the invention will be explained in reference to FIG. 1 through FIG. 5.

Figure 1:
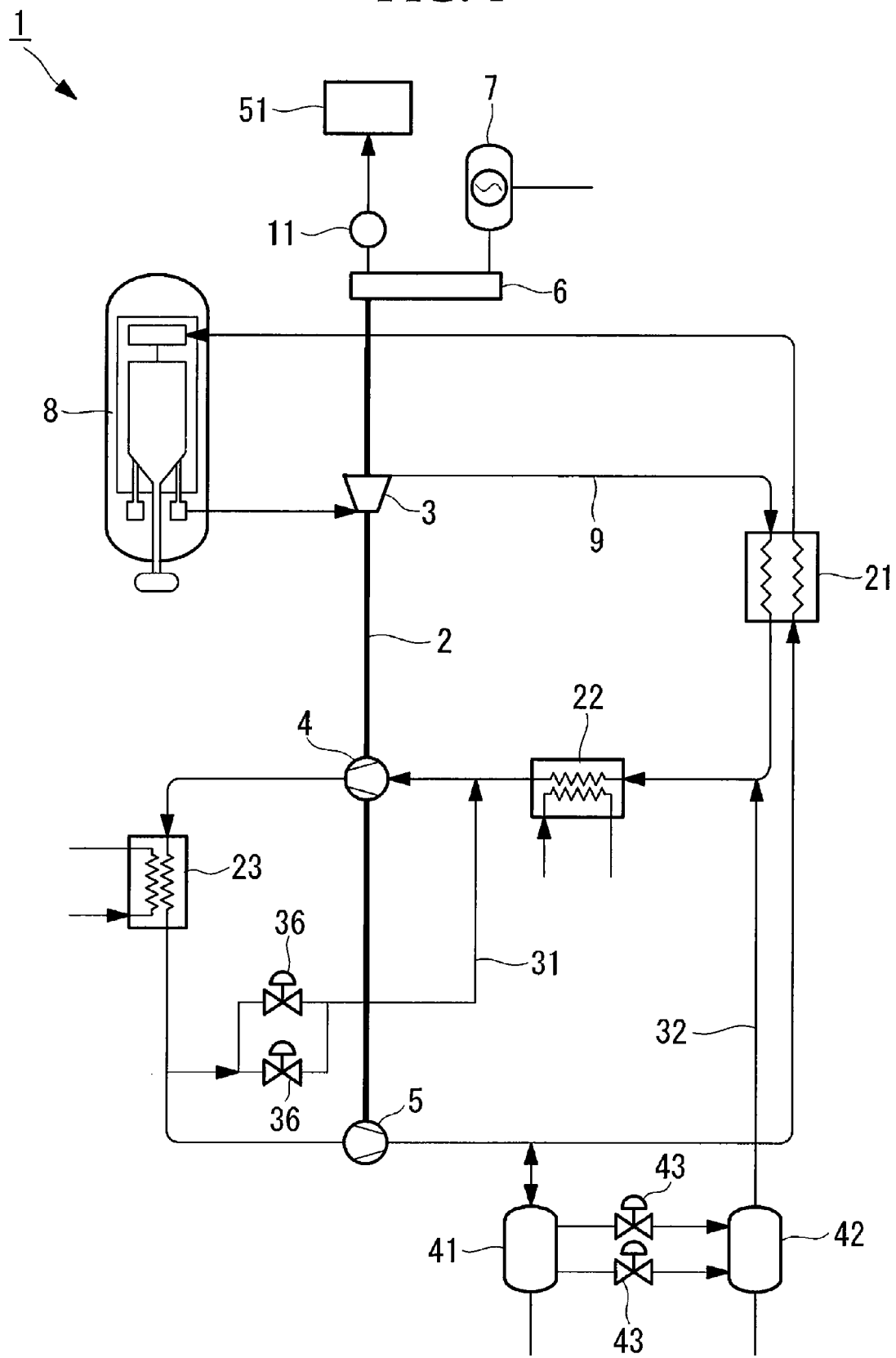
FIG. 1 is a schematic view for explaining a constitution of a power generating equipment according to a first embodiment of the invention.

FIG. 1 is a schematic view for explaining a constitution of a power generating equipment according to the embodiment.

According to the embodiment, an explanation will be given by applying the invention to a power generating equipment including a gas turbine for circulating a helium gas constituting a working fluid in a closed circulating system (closed style) and using an atomic reactor as a heat source of heating a compressed working fluid.

As shown by FIG. 1, a power generating equipment (turbine equipment) 1 is mainly provided with a turbine portion 3, a low pressure compressor (compressing portion) 4, a high pressure compressor (compressing portion) 5 and a speed reduction gear portion (speed reducing portion) 6 arranged on the same rotating shaft 2, a generator (motor) 7 connected to the speed reduction gear portion 6, an atomic reactor 8 for heating a working fluid compressed by the high pressure compressor 5, and a circulating flow path for circulating a working fluid in an order of the atomic reactor 8, the turbine portion 3, the low pressure compressor 4 and the high pressure compressor 5.

As shown by FIG. 1, the turbine portion 3 is arranged at the rotating shaft 2 and driven to rotate by the high temperature high pressure working fluid supplied from the reactor 8.

The working fluid is connected to be able to flow between the atomic reactor 8 and the turbine portion 3 and between the turbine portion 3 and the low pressure compressor 4 by the circulating flow path 9.

As shown by FIG. 1, the low pressure compressor 4 is arranged at the rotating shaft 2 for compressing the working fluid by using a rotational drive force supplied by way of the rotating shaft 2.

The working fluid is connected to be able to flow by the circulating flow path 9 between the turbine portion 3 and the low pressure compressor 4 and between the low pressure compressor 4 and the high pressure compressor 5.

As shown by FIG. 1, the high pressure compressor 5 is arranged at the rotating shaft 2 for compressing the working fluid to a higher pressure by using a rotational drive force supplied by way of the rotating shaft 2.

The working fluid is connected to be able to flow by the circulating flow path 9 between the low pressure compressor 4 and the high pressure compressor 5 and between the high pressure compressor 5 and the atomic reactor 8.

As shown by FIG. 1, the atomic reactor 8 is arranged between the high pressure compressor 5 and the turbine portion 3 for supplying the high temperature high pressure working fluid to the turbine portion 3 by heating the high pressure working fluid delivered from the high pressure compressor 5.

The working fluid is connected to be able to flow by the circulating flow path 9 between the high pressure compressor 5 and the atomic reactor 8 and between the atomic reactor 8 and the turbine portion 3.

As shown by FIG. 1, the speed reduction gear portion 6 connects the rotating shaft 2 and the generator 7 to be able to transmit the rotational drive force for transmitting the rotational drive force from the rotating shaft 2 to the generator 7, or from the generator 7 to the rotating shaft 2 while converting a revolution number.

The speed reduction gear portion 6 is constituted by a combination of a plurality of gears and various combination styles can be used. For example, although a planetary gear can be used as the speed reduction gear portion 6, the invention is not particularly limited thereto.

Figure 2:
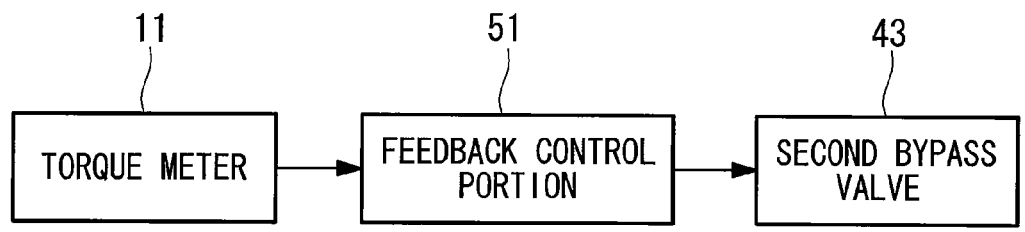
FIG. 2 is a block diagram for explaining a control of the power generating equipment of FIG. 1.

FIG. 2 is a block diagram for explaining a control of the power generating equipment of FIG. 1.

As shown by FIG. 1, the speed reduction gear portion 6 is provided with a torque meter (load detecting portion) 11 for measuring a torque applied to the speed reduction gear portion 6.

As shown by FIG. 2, the torque measured by the torque meter 11 is outputted to a feedback control portion 51.

As shown by FIG. 1, the generator 7 is connected to the speed reduction gear portion 6 to be able to transmit the rotational drive force and is driven to rotate by the turbine portion 3 by way of the rotating shaft 2 and the speed reduction gear portion 6 to generate a power when the power generating equipment 1 is brought into an operating state.

On the other hand, in starting the power generating equipment 1, the turbine portion 3, the low pressure compressor 4 and the high pressure compressor 5 are driven to rotate by way of the rotating shaft 2 and the speed reduction gear portion 6 by using a power supplied from outside.

As shown by FIG. 1, the circulating flow path 9 is a flow path of circulating the working fluid among the reactor 8, the turbine portion 3, the low pressure compressor 4 and the high pressure compressor 5.

The circulating flow path 9 is provided with a regenerating heat exchanger 21 for carrying out heat exchange between the working fluid flowing out from the turbine portion 3 and the working fluid delivered from the high pressure compressor 5, a cooler 22 for carrying out heat exchange between the working fluid sucked to the low pressure compressor 4 and sea water, an intermediate cooler 23 for carrying out heat exchange between the working fluid delivered from the low pressure compressor 4 and seat water.

As shown by FIG. 1, the regenerating heat exchanger 21 is a heat exchanger for heating the working fluid flowing to the atomic reactor 8 by recovering heat from the working fluid flowing out from the turbine portion 3. The regenerating heat exchanger 21 is arranged between the turbine portion 3 and the low pressure compressor 4 and between the high pressure compressor 5 and the atomic reactor 8.

As shown by FIG. 1, the cooler 22 is a heat exchanger for radiating heat of the working fluid flowing out from the regenerating heat exchanger 21 to sea water. The cooler 22 is arranged between the regenerating heat exchanger 21 and the low pressure compressor 4.

Further, the cooler 22 of a constitution of radiating heat of the working fluid to seat water as described above may be used, or a heat exchanger of a constitution of radiating heat of the working fluid to other medium may be used, and the invention is not particularly limited.

As shown by FIG. 1, the intermediate cooler 23 is a heat exchanger of radiating heat of the working fluid delivered from the low pressure compressor 4 to sea water. The intermediate cooler 23 is arranged between the low pressure compressor 4 and the high pressure compressor 5.

Further, the intermediate cooler 23 of a constitution of radiating heat of the working fluid to sea water as described above may be used, the heat exchanger of a constitution of radiating heat of the working fluid to other medium may be used, the invention is not particularly limited.

Further, as shown by FIG. 1, the circulating flow path 9 is provided with a first bypass flow path (bypass flow path) 31 for increasing a flow rate of the working fluid sucked to the low pressure compressor 4, and a second bypass flow path (bypass flow path) 32 for controlling an amount of filling the working fluid, that is, a flow rate of the working fluid flowing at inside of the circulating flow path 9 and increasing a flow rate of the working fluid sucked to the low pressure compressor 4 and the high pressure compressor 5.

As shown by FIG. 1, the first bypass flow path 31 is a flow path of recirculating a portion of the working fluid flowing out from the intermediate cooler 23 to between the low pressure compressor 4 and the cooler 22. In other words, the first bypass flow path 31 is a flow path one end of which is connected to the circulating flow paths 9 between the intermediate cooler 23 and the high pressure compressor 5 and other end of which is connected to the circulating flow path 9 between the cooler 22 and the low pressure compressor 4.

The first bypass flow path 31 is provided with a first bypass valve 36 for controlling a flow rate of the recirculating working fluid.

As shown by FIG. 1, the first bypass valve 36 is a valve arranged at the first bypass flow path 31 for controlling a flow rate of the working fluid flowing in the first bypass flow path 31. In other words, the first bypass valve 36 is a valve of controlling the flow rate of the working fluid sucked to the low pressure compressor 4 for preventing surging at the low pressure compressor 4 from being brought about by controlling the flow rate.

Although according to the embodiment, an explanation will be given by being applied to an example of arranging the two first bypass valves 36 in parallel, a number of the first bypass valves 36 may be larger or smaller than two and is not particularly limited.

As shown by FIG. 1, the second bypass flow path 32 is a flow path of filling the working fluid to one or both of a delivery side of the high pressure compressor 5 and a suction side of the low pressure compressor 4 and a flow path of recirculating a portion of the working fluid delivered from the high pressure compressor 5 to between the regenerating heat exchanger 21 and the cooler 22. In other words, the second bypass flow path 32 is a flow path one end portion of which is connected to between the high pressure compressor 5 and the regenerating heat exchanger 21 and other end portion of which is connected between the cooler 22 and the low pressure compressor 4.

The second bypass flow path 32 is provided with a first buffer tank 41 and a second buffer tank 42 connected to outside working fluid filling system and a second bypass valve (flow rate controlling portion) 43 arranged between the first buffer tank 41 and the second buffer tank 42.

The first buffer tank 41 is a tank arranged on a side of the high pressure compressor 5 of the second bypass flow path 32. The second buffer tank 42 is a tank arranged on a side of the cooler 22 of the second bypass flow path 32.

When the working fluid is filled to the circulating flow path 9, the working fluid is filled from the working fluid filling system by way of one or both of the first buffer tank 41 and the second buffer tank 42.

On the other hand, when the flow rate of the working fluid sucked to the low pressure compressor 4 and the high pressure compressor 5 is controlled, a portion of the working fluid delivered from the high pressure compressor 5 is made to flow in an order of the first buffer tank 41 and the second buffer tank 42 to be recirculated to between the regenerating heat exchanger 21 and the cooler 22.

As shown by FIG. 1, the second bypass valve 43 is a valve arranged at the second bypass flow path 32 between the first buffer tank 41 and the second buffer tank 42 for controlling the flow rate of the working fluid flowing in the second bypass flow path 32. In other words, the second bypass valve 43 is a valve for controlling the flow rate of the working fluid sucked to the low pressure compressor 4 and the high pressure compressor 5 in operating the power generating equipment 1 and is a valve for controlling a torque applied to the speed reduction gear portion 6 in starting.

As shown by FIG. 2, the second bypass valve 43 is inputted with a control signal for controlling a valve opening degree from the feedback control portion 51.

Although according to the embodiment, an explanation will be given by being applied to an example of arranging two of the second bypass valves 43 in parallel, a number of the second bypass valves 43 may be larger or smaller than two and is not particularly limited.

Further, as shown by FIG. 2, the power generating equipment 1 is provided with the feedback control portion (control portion) 51 for controlling the opening degree of the second bypass valve 43 based on a torque signal constituting a value of a torque measured by the torque meter 11.

An explanation will be given of a control of an opening degree of the second bypass valve 43 of the feedback control portion 51.

Next, power generation at the power generating equipment 1 comprising the above-described constitution will be explained.

When an operation, that is, power generation is carried out at the power generating equipment 1, as shown by FIG. 1, the high pressure working fluid flowing to the atomic reactor 8 is further heated by absorbing heat generated at the atomic reactor 8 to flow out from the atomic reactor 8 to the circulating flow path 9 as the working fluid of, for example, about 900° C.

The working fluid flows to the turbine portion 3 from the circulating flow path 9. The turbine portion 3 generates the rotational drive force from an energy provided to the flowing high temperature high pressure working fluid to transmit the generated rotational drive force to the rotating shaft 2.

The rotational drive force is transmitted from the rotating shaft 2 to the speed reduction gear portion 6 and is transmitted from the speed reduction gear portion 6 to the generator 7. A revolution number of the rotating shaft 2 is reduced to a revolution number pertinent for driving the generator 7 by the speed reduction gear portion 6.

The generator 7 generates power by being driven to rotate by the transmitted rotational drive force.

On the other hand, a temperature of the working fluid is lowered to about 500° C. when flowing out from the turbine portion 3 and the working fluid flows to the regenerating heat exchanger 21 by way of the circulating flow path 9. At the regenerating heat exchanger 21, heat exchange is carried out between the working fluid flowing from the turbine portion 3 and the working fluid delivered from the high pressure compressor 5 mentioned later and the working fluid flows out from the regenerating heat exchanger 21.

The working fluid flowing out from the regenerating heat exchanger 21 flows to the cooler 22 by way of the circulating flow path 9 to carry out heat exchange between the working fluid and sea water, cooled to about 20° C., thereafter, flows out from the cooler 22.

The working fluid flowing out from the cooler 22 is sucked to the low pressure compressor 4 by way of the circulating flow path 9. The low pressure compressor 4 compresses the sucked working fluid by the rotational drive force supplied from the turbine portion 3 by way of the rotating shaft 2 to deliver to the circulating flow path 9.

The working fluid delivered from the low pressure compressor 4 flows to the intermediate cooler 23 by way of the circulating flow path 9 to carry out heat exchange between the working fluid and sea water, cooled to about 20° C., thereafter, flows out from the intermediate cooler 23.

The working fluid flowing out from the intermediate cooler 23 is sucked to the high pressure compressor 5 by way of the circulating flow path 9. The high pressure compressor 5 compresses the working fluid compressed by the low pressure compressor 4 to a higher pressure by the rotational drive force supplied from the turbine portion 3 by way of the rotating shaft 2 to deliver to the circulating flow path 9.

The working fluid delivered from the high pressure compressor 5 flows to the regenerating heat exchanger 21 by way of the circulating flow path 9, carries out heat exchange between the working fluid and the working fluid flowing out from the turbine portion 3, heated to, for example, about 450° C. and flows out to the circulating flow path 9.

The working fluid flowing out from the regenerating heat exchanger 21 flows to the atomic reactor 8 by way of the circulating flow path 9 to repeat the above-described procedure.

When a flow rate of the working fluid flowing in the circulating flow path 9 is small, in other words, when a flow rate of the working fluid flowing to the low pressure compressor 4 is small, the first bypass valve 36 is opened to prevent surging at the low pressure compressor 4 from being brought about.

That is, by opening the first bypass valve 36, a portion of the working fluid delivered from the low pressure compressor 4 and flowing out from the intermediate cooler 23 flows to the circulating flow path 9 between the cooler 22 and the low pressure compressor 4 by way of the first bypass flow path 31. Therefore, the flow rate of the working fluid flowing to the low pressure compressor 4 is increased in comparison with a flow rate of circulating the working fluid in a total of the circulating flow path 9 to prevent surging at the low pressure compressor 4 from being brought about.

On the other hand, when the flow rate of the working fluid flowing to the low pressure compressor 4 and the high pressure compressor 5 is small, the second bypass valve 43 is opened to prevent surging at the low pressure compressor 4 and the high pressure compressor 5 from being brought about.

That is, by opening the second bypass valve 43, a portion of the working fluid delivered from the high pressure compressor 5 flows to the circulating flow path 9 between the regenerating heat exchanger 21 and the cooler 22 by way of the second bypass flow path 32, the first buffer tank 41 and the second buffer tank 42. Therefore, the flow rate of the working fluid flowing to the low pressure compressor 4 and the high pressure compressor 5 is increased in comparison with the flow rate of circulating the working fluid in the total of the circulating flow path 9 to prevent surging at the low pressure compressor 4 and the high pressure compressor 5 from being brought about.

Further, when an amount of filling the working fluid circulating in the circulating flow path 9 is small, the working fluid is filled to inside of the circulating flow path 9 from the working fluid filling system connected by way of the first buffer tank 41 and the second buffer tank 42.

Next, a control in starting the power generating equipment 1 constituting a characteristic of the embodiment will be explained.

In starting the power generating equipment 1, as shown by FIG. 1, a power is supplied from outside to the generator 7. The generator 7 supplied with the power generates the rotational drive force as a motor to drive to rotate the turbine portion 3, the low pressure compressor 4 and the high pressure compressor 5 by way of the speed reduction gear portion 6 and the rotating shaft 2.

Figure 3:
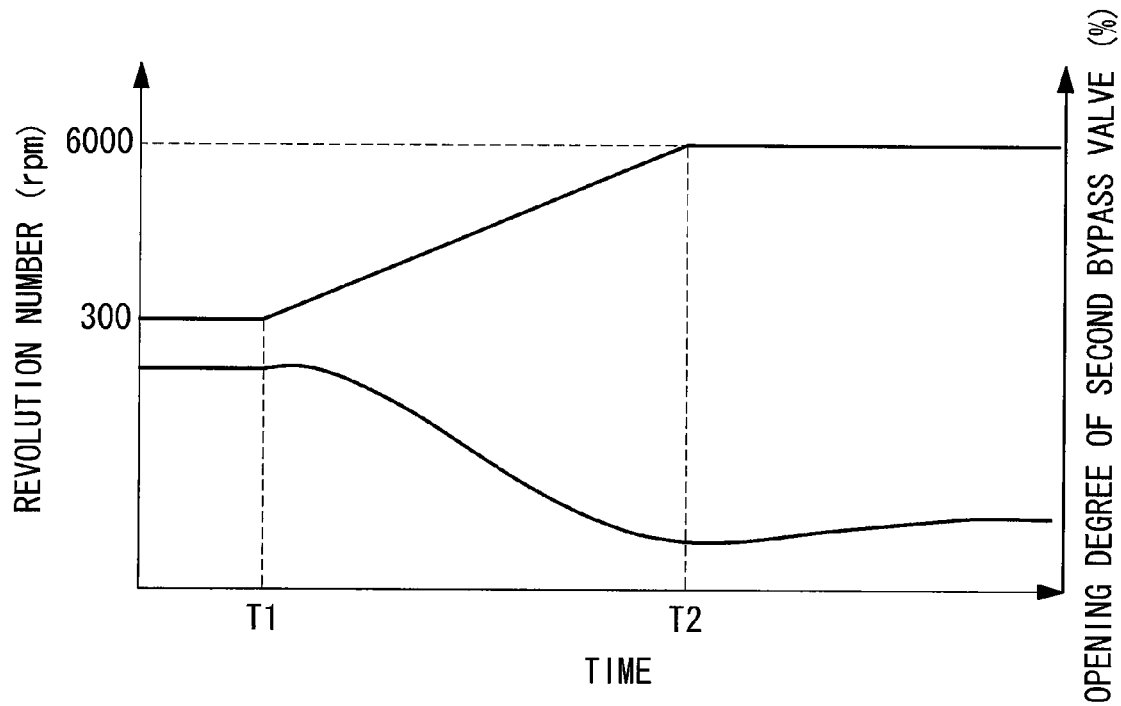
FIG. 3 is a graph for explaining a change over time of a revolution number and a change over time of a second bypass valve opening degree in starting the power generating equipment of FIG. 1.

FIG. 3 is a graph for explaining a change over time of the revolution number in starting the power generating equipment of FIG. 1 and a change over time of an opening degree of the second bypass valve.

When the power generating equipment 1 is started, as shown by FIG. 3, the low pressure compressor 4, the high pressure compressor 5 and the like are driven to rotate by a rotational speed of about 300 rotations per minute and the rotational speed of about 300 rotations per minute is maintained until first predetermined time T1 at which a speed accelerating instruction is inputted.

At this occasion, as shown by FIG. 1 and FIG. 2, the torque applied to the speed reduction gear portion 6 is measured by the torque meter 11, and a value of the measured torque, that is, the torque signal is inputted to the feedback control portion 51. The value of the torque measured by the torque meter 11 is more proximate to 0 than a target torque (predetermined value), and therefore, the feedback control portion 51 outputs a control signal of opening the second bypass valve 43.

When the second bypass valve 43 is opened, a portion of the working fluid delivered from the high pressure compressor 5 is recirculated to the low pressure compressor 4 by way of the second bypass flow path 32, the first buffer tank 41 and the second buffer tank 42. In other words, the flow rate of the working fluid compressed by the low pressure compressor 4 and the high pressure compressor 5 is increased and the drive torque necessary for driving the low pressure compressor 4 and the high pressure compressor 5 is increased.

Then, also the torque applied to the generator 7 constituting the motor, and the speed reduction gear portion 6 arranged between the low pressure compressor 4 and the high pressure compressor 5 is increased.

Figure 4:
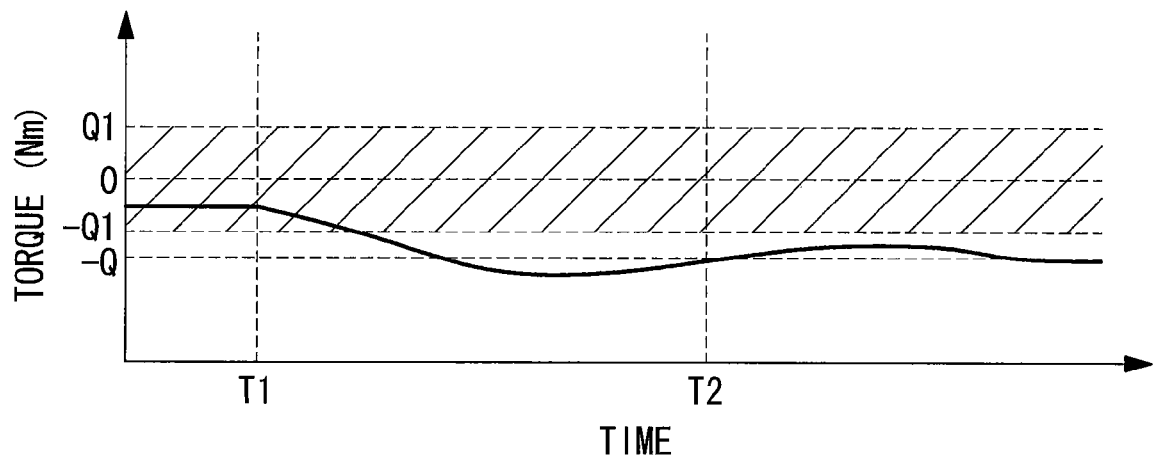
FIG. 4 is a graph for explaining a change over time of a torque applied to a speed reduction gear portion in starting the power generating equipment of FIG. 1.

FIG. 4 is a graph for explaining a change over time of the torque applied to the speed reduction gear portion in starting the power generating equipment of FIG. 1.

From starting to the first predetermined time T1, the rotational speed of the low pressure compressor 4, the high pressure compressor 5 or the like is low, further, also the temperature of the atomic reactor 8 is brought into a low state, and therefore, the control signal of opening the second bypass valve 43 is outputted from the feedback control portion 51 until the second bypass valve 43 is fully opened. The torque from starting to the first predetermined time T1 shown in FIG. 4 indicates the torque applied to the speed reduction gear portion 6 in a state of fully opening the second bypass valve 43.

That is, from starting to the first predetermined time T1, the torque measured by the torque meter 11 is included in a range from 0 to a negative first predetermined torque (predetermined value) −Q1.

Here, a positive torque in FIG. 4 indicates a value of a torque applied to the speed reduction gear portion 6 when the generator 7 is driven to rotate by the turbine portion 3, and a negative torque indicates a value of a torque applied to the speed reduction gear portion 6 when the turbine portion 3, the low pressure compressor 4 and the high pressure compressor 5 are driven to rotate by the generator 7.

Further, a region between the positive first predetermined torque Q1 to the negative first predetermined torque −Q1 in FIG. 4 is a region in which a value of the torque applied to the speed reduction gear portion 6 is small and there is a high possibility of bringing about fretting in a gear or the like constituting the speed reduction gear portion 6.

Figure 5:
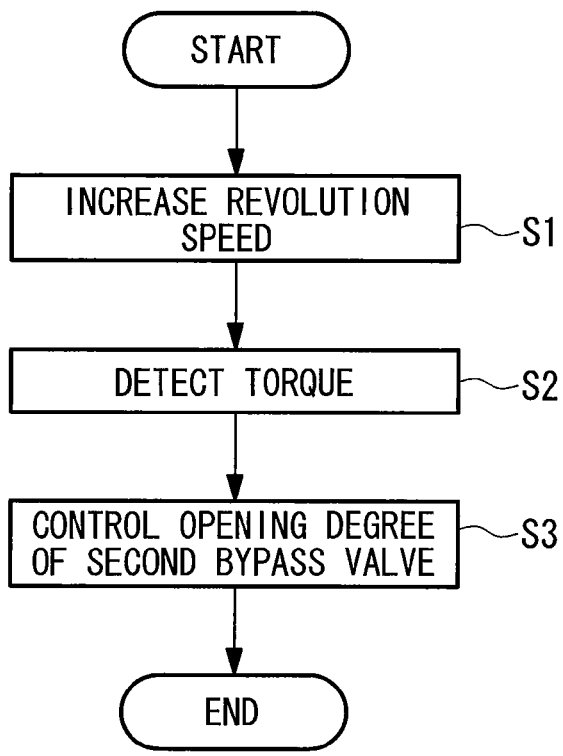
FIG. 5 is a flowchart for explaining a control in starting the power generating equipment of FIG. 1.

FIG. 5 is a flowchart for explaining a control in starting the power generating equipment of FIG. 1.

When the speed accelerating instruction is inputted and an increase in the rotational speed of the low pressure compressor 4 or the like is started, that is, when the first predetermined time T1 has elapsed, as shown by FIG. 3, the rotational speed of the low pressure compressor 4, the high pressure compressor 5 or the like is increased with an elapse of time and is accelerated to about 6000 rotations per minute of a rated rotational number at the second predetermined time T2 (step S1 (speed accelerating step)).

When the rotational speed is increased, also the flow rate of the working fluid compressed by the low pressure compressor 4 and the high pressure compressor 5 is increased, and therefore, also the drive torque necessary for driving the low pressure compressor 4 and the high pressure compressor 5 is increased.

Therefore, also the torque applied to the speed reduction gear portion 6 measured by the torque meter 11 is increased (step S2 (load detecting step)). The feedback control portion 51 outputs the control signal of controlling the opening degree of the second bypass valve 43 in accordance with an inputted torque signal (step S3 (bypass flow rate controlling step)).

That is, when an absolute value of the torque applied to the speed reduction gear portion 6 is smaller than an absolute value of the target torque −Q, the feedback control portion 51 outputs the control signal of opening the second bypass valve 43 to carry out the control of making the torque applied to the speed reduction gear portion 6 proximate to the target torque −Q. On the other hand, when the absolute value of the torque applied to the speed reduction gear portion 6 is larger than the absolute value of the target torque −Q, the feedback control portion 51 outputs the control signal of closing the second bypass valve 43 to carry out a control of making the torque applied to the speed reduction gear portion 6 proximate to the target torque −Q.

According to the above-described constitution, by controlling the flow rate of the working fluid bypassing from the delivery side of the high pressure compressor 5 to the suction side of the of the low pressure compressor 4 based on the torque applied to the speed reduction gear portion 6 in operating to accelerate the speed of the low pressure compressor 4, the high pressure compressor 5 and the turbine portion 3, the torque applied to the speed reduction gear portion 6 is controlled to the target torque −Q.

Thereby, the control of the torque applied to the speed reduction gear portion 6 becomes accurate in comparison with, for example, a method of controlling the flow rate of the bypassing working fluid based on a time period elapsed from starting to operate to accelerate the speed.

That is, when the absolute value of the torque applied to the speed reduction gear portion 6 is equal to or smaller than the absolute value of the target torque −Q, the flow rate of the working fluid passing through the low pressure compressor 4 and the high pressure compressor 5 is increased by increasing the flow rate of the bypassing working fluid. When the flow rate of the passing working fluid is increased, the torque necessary for driving the low pressure compressor 4 and the high pressure compressor 5 is increased, and therefore, the torque applied to the speed reduction gear portion 6 arranged between the generator 7 and the low pressure compressor 4 and the high pressure compressor 5 is increased and the torque applied to the speed reduction gear portion 6 is controlled to the target torque −Q.

On the other hand, when the absolute value of the torque applied to the speed reduction gear portion 6 is equal to or larger than the absolute value of the target torque −Q, the flow rate of the working fluid passing through the low pressure compressor 4 and the high pressure compressor 5 is reduced by reducing the flow rate of the bypassing working fluid. When the flow rate of the passing working fluid is reduced, the torque necessary for driving the low pressure compressor 4 and the high pressure compressor 5 is reduced, and therefore, the torque applied to the speed reduction gear portion 6 arranged between the generator 7 and the low pressure compressor 4 and the high pressure compressor 5 is reduced and the torque applied to the speed reduction gear portion 6 is controlled to the target torque −Q.

Further, the torque applied to the speed reduction gear portion 6 is controlled by controlling only the flow rate of the bypassing working fluid, and therefore, even in a case of the power generating equipment 1 provided with the heat source the speed accelerating rate of which is restricted of, for example, the atomic reactor 8 or the like of heating the working fluid, the torque applied to the speed reduction gear portion 6 can be controlled to the target torque −Q while complying with a restriction of the speed accelerating rate or the like.

Further, although according to the above-described embodiment, an explanation has been given by being applied to the example of measuring the load applied to the speed reduction gear portion 6 by using the torque meter 11 as the torque applied to the speed reduction gear portion 6, not only the load is measured as the torque but a displacement of a gear constituting the speed reduction gear portion 6 may be measured as the load and the invention is not particularly limited thereto.

Further, although according to the above-described embodiment, an explanation has been given by being applied to the example in which the compressor is constituted by two stages, that is, the low pressure compressor 4 and the high pressure compressor 5, the compressor may be constituted by one stage or may be 3 stages or more and the invention is not particularly limited thereto.

Although according to the above-described embodiment, an explanation has been given by being applied to the example of controlling the opening degree of the second bypass valve 43 by the feedback control portion 51, an opening degree of the first bypass valve 36 may be controlled by the feedback control portion 51, and the invention is not particularly limited thereto.

Although according to the above-described embodiment, an explanation has been given by being applied to the example of controlling the second bypass valve 43 in starting the power generating equipment 1, a similar control may be carried out when the power generating equipment 1 is stopped, or the flow rate of the working fluid flowing in the circulating flow path 9 is small, and the invention is not particularly limited thereto.

Second Embodiment

Next, a second embodiment of the invention will be explained in reference to FIG. 6 through FIG. 8.

Although a basic constitution of a power generating equipment of the embodiment is similar to that of the first embodiment, the embodiment differs from the first embodiment in a method of controlling the first bypass valve. Therefore, according to the embodiment, only control of the first bypass valve will be explained in reference to FIG. 6 through FIG. 8, and an explanation of other constituent elements or the like will be omitted.

Figure 6:
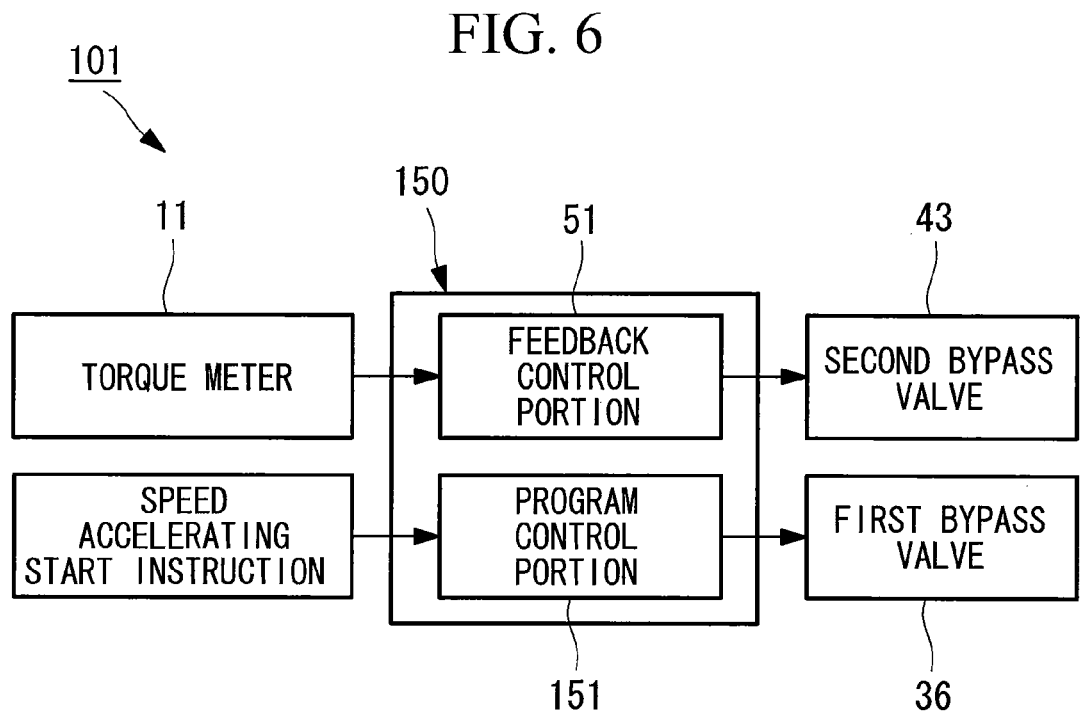
FIG. 6 is a block diagram for explaining a control of a power generating equipment according to a second embodiment of the invention.

FIG. 6 is a block diagram for explaining the control of the power generating equipment according to the embodiment.

Further, constituent elements the same as those of the first embodiment are attached with the same notations and an explanation thereof will be omitted.

As shown by FIG. 6, a control portion 150 in a power generating equipment 101 of the embodiment is provided with the feedback control portion 51 for controlling the opening degree of the second bypass valve 43, and a program control portion (control portion) 151 for controlling the opening degree of the first bypass valve (flow rate control portion) 36.

The program control portion 151 controls the opening degree of the first bypass valve 36 based on the speed accelerating instruction for instructing to accelerate the rotational speed of the low pressure compressor 4 and the like in starting the power generating equipment 1.

A control of the opening degree of the first bypass valve 36 at the program control portion 151 will be explained as follows.

Next, a control in starting a power generating equipment 101 constituting a characteristic of the embodiment will be explained.

Further, although in starting, the feedback control portion 51 and the program control portion 151 respectively control the opening degrees of the second bypass valve 43 and the first bypass valve 36, the control of the opening degree of the second bypass valve 43 by the feedback control portion 51 is similar to the control in the first embodiment, and therefore, an explanation thereof will be omitted.

Further, power generation at the power generating equipment 101 is similar to the power generation according to the first embodiment, and therefore, an explanation thereof will be omitted.

Figure 7:
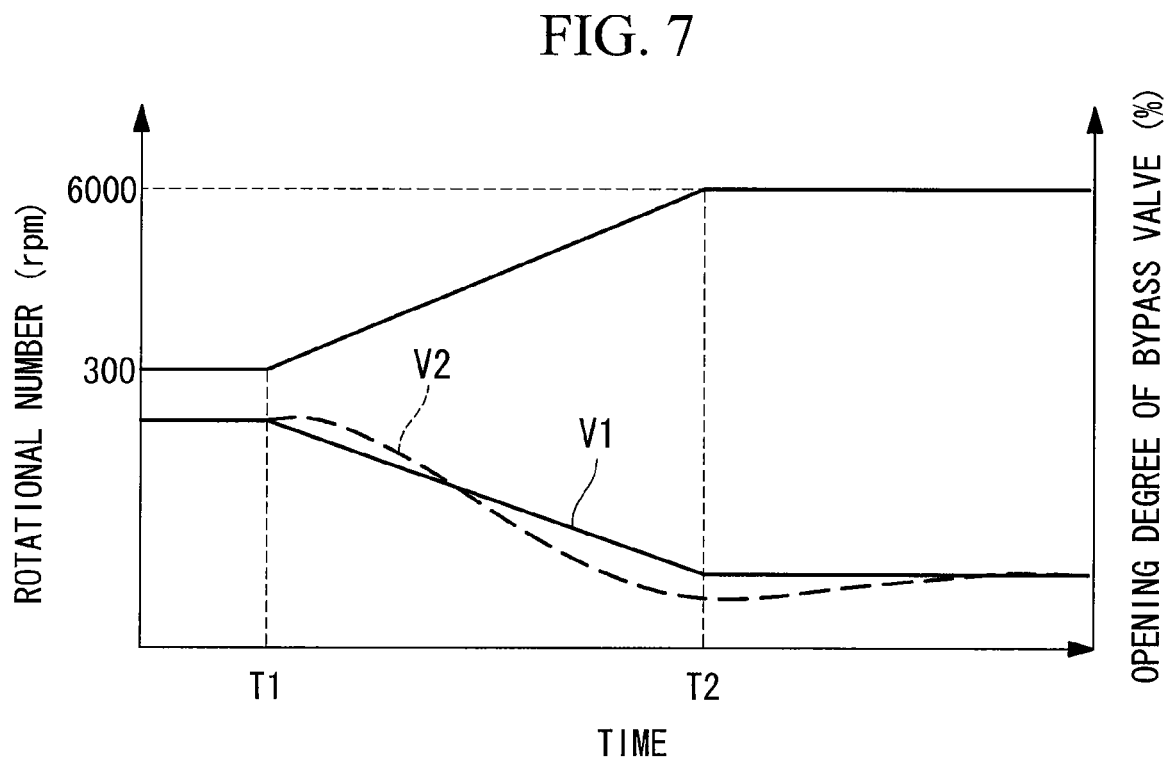
FIG. 7 is a graph for explaining a change over time of a revolution number and changes over time of first and second bypass valve opening degrees in starting the power generating equipment of FIG. 1.

FIG. 7 is a graph for explaining a change over time of the revolution number and a change over time of the first and the second bypass valve opening degrees in starting the power generating equipment of FIG. 6. Further, a graph V1 in FIG. 7 indicates the opening degree of the first bypass valve 36 and a graph V2 indicates the opening degree of the second bypass valve 43.

When the power generating equipment 101 is started, as shown by FIG. 7, the low pressure compressor 4, the high pressure compressor 5 and the like are driven to rotate at a rotational speed of about 300 rotations per minute and the rotational speed of about 300 rotations per minute is maintained until the first predetermined time T1 at which the speed accelerating instruction is inputted.

At this occasion, the program control portion 151 outputs a control signal of fully opening the first bypass valve 36.

When the first bypass valve 36 is opened, a portion of a refrigerant delivered from the low pressure compressor 4 and passing the intermediate cooler 23 is recirculated to the suction side of the low pressure compressor 4 by way of the first bypass flow path 31. In other words, the flow rate of the working fluid compressed by the low pressure compressor 4 is increased and the drive torque necessary for driving the low pressure compressor 4 is increased (refer to FIG. 1).

Then, also the torque applied to the speed reduction gear portion 6 arranged between the generator 7 constituting a motor and the low pressure compressor 4 is increased.

Figure 8:
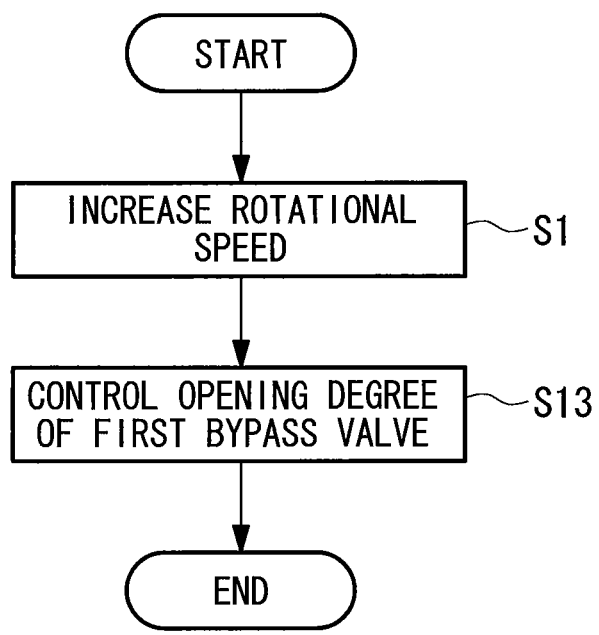
FIG. 8 is a flowchart for explaining a control in starting the power generating equipment of FIG. 6.

FIG. 8 is a flowchart for explaining the control in starting the power generating equipment of FIG. 6.

Thereafter, when the rotational speed of the low pressure compressor 4 or the like is started by inputting the speed accelerating instruction (step S1 (speed accelerating step)), the program control portion 151 outputs a control signal of reducing the opening degree of the first bypass valve 36 in accordance with an elapsed time period after inputting the speed accelerating instruction (step S13 (bypass flow rate control step)).

That is, when the rotational speed of the low pressure compressor 4 or the like is increased with an elapse of time, also the flow rate of the working fluid compressed by the low pressure compressor 4 is increased, and therefore, also the drive torque necessary for driving the low pressure compressor 4 is increased with an elapse of time.

Therefore, the program control portion 151 outputs the control signal of reducing the opening degree of the first bypass valve 36 in proportion to the elapse of time after inputting the speed accelerating instruction.

When the opening degree of the first bypass valve 36 is reduced, the flow rate of the working fluid flowing through the first bypass valve 36 is reduced and the flow rate of the working fluid recirculated to the low pressure compressor 4 is reduced. Therefore, an increase in the flow rate of the working fluid compressed by the low pressure compressor 4 is restrained and also an increase in the drive torque necessary for driving the low pressure compressor 4 is restrained.

According to the above-described constitution, in operating to accelerate the speed of the low pressure compressor 4, the high pressure compressor 5, and the turbine portion 3, by controlling the flow rate of the working fluid bypassed from the delivery side to the suction side of the low pressure compressor 4 based on the elapsed time period after starting to operate to accelerate the speed, the torque applied to the speed reduction gear portion 6 can be controlled to the target torque −Q.

Thereby, the control of the load applied to the speed reduction gear portion 6 is facilitated in comparison with, for example, a method of controlling the flow rate of the bypassed working fluid based on the torque applied to the speed reduction gear portion 6.

That is, in starting to operate to accelerate speed, a temperature of the working fluid circulated to the low pressure compressor 4, the high pressure compressor 5 and the turbine portion 3 is low, the torque necessary for driving the low pressure compressor 4 or the like is small, and therefore, also the load applied to the speed reduction gear portion 6 is small. Therefore, in starting to operate to accelerate speed, the torque applied to the speed reduction gear portion 6 can be ensured by ensuring the flow rate of the working fluid passing through the low pressure compressor 4 without reducing the flow rate of the bypassed working fluid.

Thereafter, when time has elapsed after starting to operate to accelerate speed, the temperature of the working fluid circulated to the low pressure compressor 4, the high pressure compressor 5 and the turbine portion 3 becomes high, the torque necessary for driving the low pressure compressor 4 or the like is increased and the torque applied to the speed reduction gear portion 6 is increased. Therefore, by reducing the flow rate of the bypassed working fluid with an elapse of time after starting to operate to accelerate speed, an increase in the torque necessary for driving the low pressure compressor 4 can be restrained and an increase in the torque applied to the speed reduction gear portion 6 can be restrained.

Further, by respectively controlling the opening degrees of the second bypass valve 43 and the first bypass valve 36 by using the feedback control portion 51 and the program control portion 151, the control of the torque applied to the speed reduction gear portion 6 is facilitated.

That is, a total capacity of the first and the second bypass valves 36, 43 can be used for controlling the torque applied to the speed reduction gear portion 6, and therefore, it is not necessary to constitute either one of the first bypass valve and the second bypass valve 43 by large-sized formation or increase a number of pieces thereof. Therefore, a change or an addition of operation end used for controlling the torque applied to the speed reduction gear portion 6 is dispensed with and an increase in initial cost of the power generating equipment 101 can be restrained.

Third Embodiment

Next, a third embodiment of the invention will be explained in reference to FIG. 9 through FIG. 11.

Although a basic constitution of a power generating equipment of the embodiment is similar to that of the first embodiment, the embodiment differs from the first embodiment in a method of controlling the second bypass valve.

Therefore, according to the embodiment, only the method of controlling the second bypass valve will be explained in reference to FIG. 9 through FIG. 11 and an explanation of other constituent element or the like will be omitted.

Figure 9:
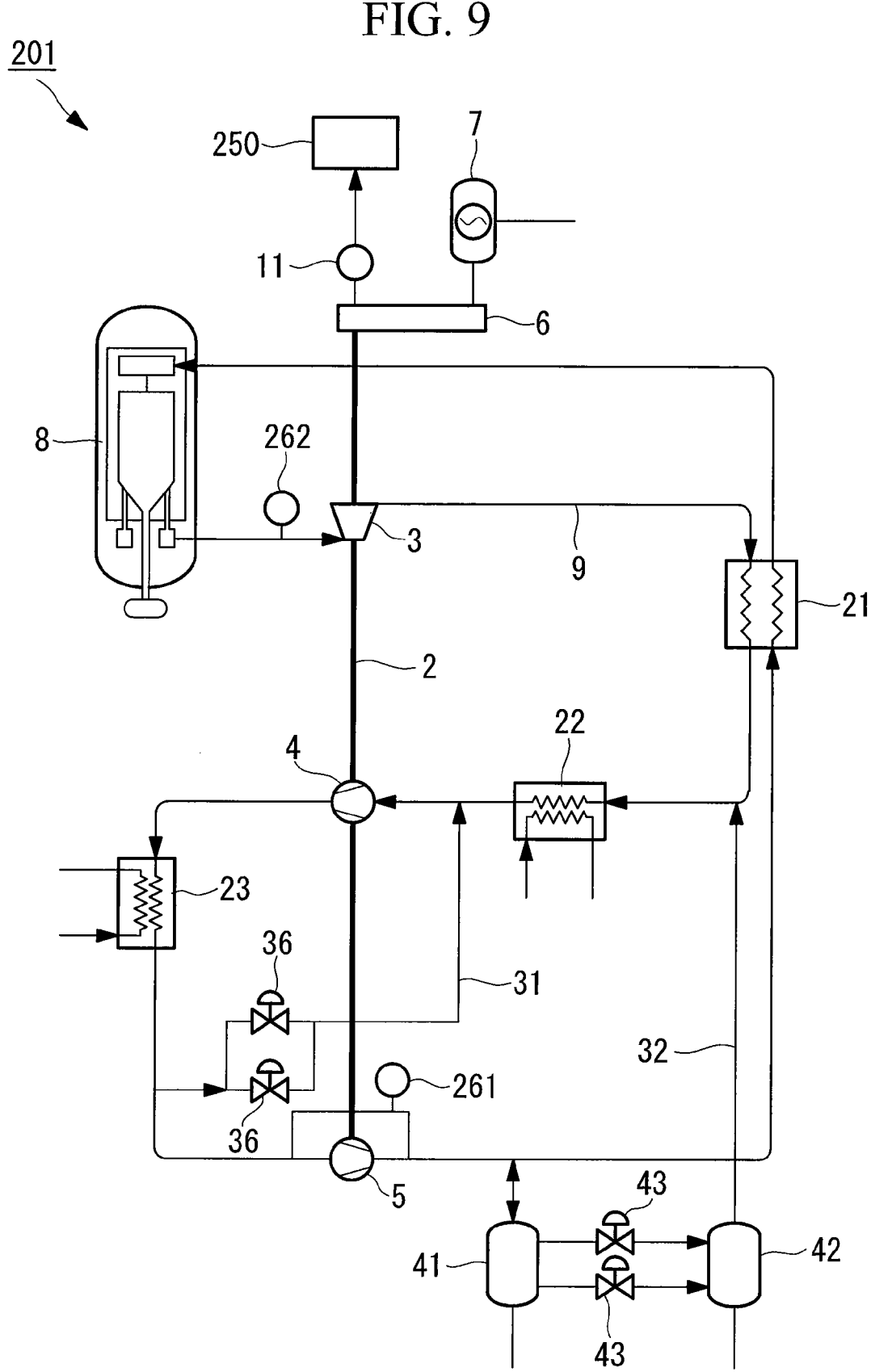
FIG. 9 is a schematic view for explaining a constitution of a power generating equipment according to a third embodiment of the invention.

FIG. 9 is a schematic view for explaining a constitution of a power generating equipment according to the embodiment. FIG. 10 is a block diagram for explaining a control of the power generating equipment of FIG. 9.

Further, constituent elements the same as those of the first embodiment are attached with the same notations and an explanation thereof will be omitted.

Figure 10:
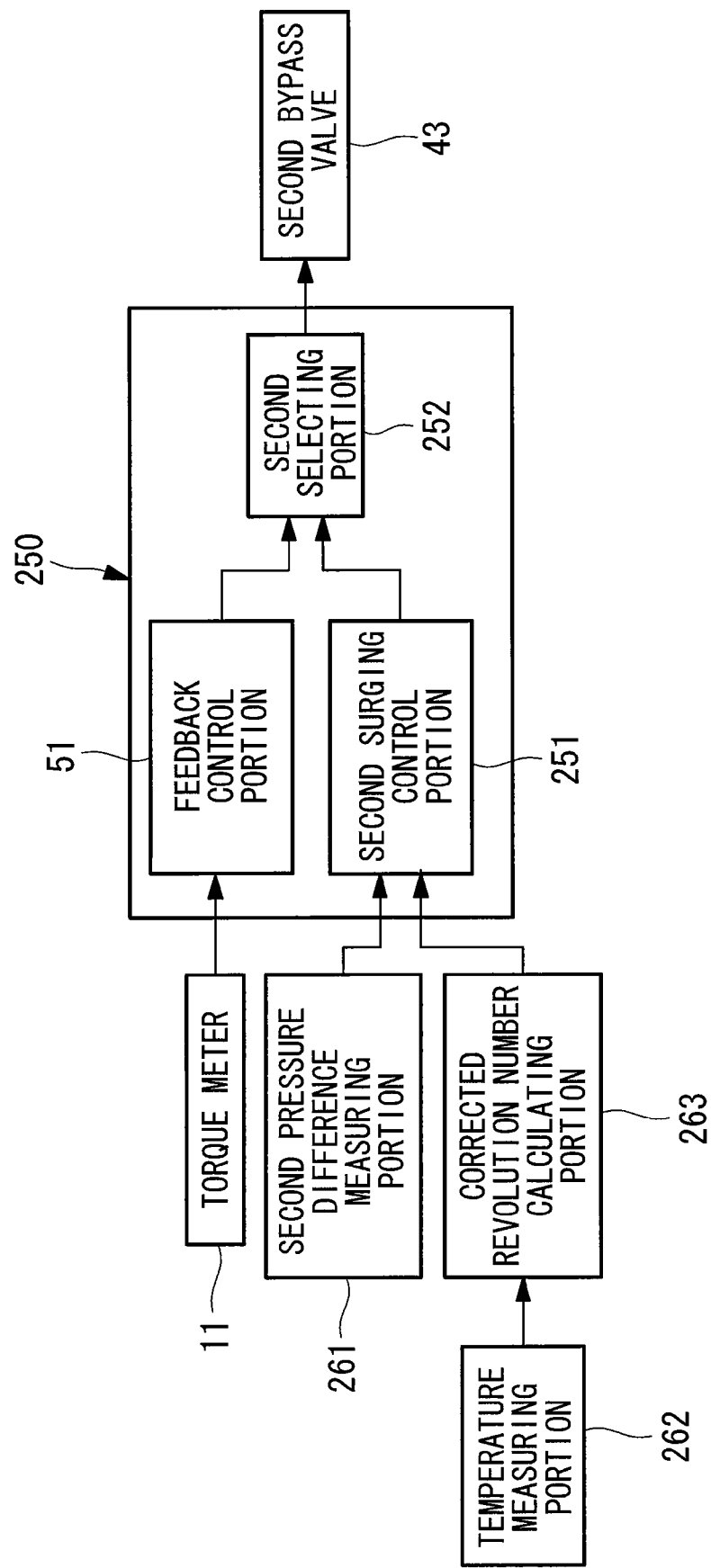
FIG. 10 is a block diagram for explaining a control of the power generating equipment of FIG. 9.

As shown by FIG. 9 and FIG. 10, a power generating equipment 201 of the embodiment is further provided with a second pressure ratio measuring portion 261 for measuring a pressure ratio of a working fluid pressure on a suction side and a working fluid pressure on a delivery side of the high pressure compressor 5, a temperature measuring portion 262 for measuring a temperature of the working fluid flowing to the turbine portion 3, and a corrected revolution number calculating portion 263 for calculating a corrected revolution number.

As shown by FIG. 9, the second pressure ratio measuring portion 261 is a measuring portion for measuring a ratio of a pressure of the working fluid sucked to the high pressure compressor 5 and the pressure of the working fluid delivered from the high pressure compressor 5. The pressure ratio measured by the second pressure ratio measuring portion 261 is inputted to a second surging control portion 251 of a control portion 250, as shown by FIG. 10.

As shown by FIG. 9, the temperature measuring portion 262 is a measuring portion of measuring a temperature of the working fluid flowing to the turbine portion 3. As shown by FIG. 10, a temperature measured by the temperature measuring portion 262 is inputted to the corrected revolution number calculating portion 263.

As shown by FIG. 10, the corrected revolution number calculating portion 263 calculates a corrected revolution number N1 by the following equation based on the temperature Ti inputted from the temperature measuring portion 262 and an actual revolution number N of the turbine portion 3.

$$N1 = N/\sqrt{(Ti)}$$

The corrected revolution number N1 calculated by the corrected revolution number calculating portion 263 is inputted to the second surging control portion 251.

Further, as shown by FIG. 10, the control portion 250 of the power generating equipment 201 of the embodiment is provided with the feedback control portion 51 for controlling an opening degree V2 of the second bypass valve 43 based on the torque measured by the torque meter 11, the second surging control portion (control portion) 251 for controlling the opening degree V2 of the second bypass valve 43 by calculating a suction flow rate for preventing surging of the high pressure compressor 5 from being brought about, and a second selecting portion 252 for selecting a control signal having a large opening degree V2 of the second bypass valve 43 from control signals outputted from the feed back control portion 51 and the second surging control portion 251.

As shown by FIG. 10, the second surging control portion 251 calculates the suction flow rate for preventing surging of the high pressure compressor 5 from being brought about based on the pressure ratio inputted from the second pressure ratio measuring portion 261 and the corrected revolution number N1 inputted from the corrected revolution number calculating portion 263, calculates the opening degree V2 of the second bypass valve 43 based on the calculated suction flow rate and outputs the control signal of controlling the opening degree V2.

The control signal outputted from the second surging control portion 251 is inputted to the second selecting portion 252.

Here, the calculated suction flow rate for preventing surging from being brought about is a flow rate of adding a predetermined allowance (margin) to the suction flow rate of bringing about surging in the high pressure compressor 5. Therefore, the calculated opening degree V2 of the second bypass valve 43 is an opening degree for making the working fluid of the flow rate added with the above-described margin flow to the high pressure compressor 5.

As shown by FIG. 10, the second selecting portion 252 selects the control signal having the larger opening degree from the opening degrees V2 of the second bypass valve 43 applied to the control signal inputted from the feedback control portion 51 and the control signal inputted from the second surging control portion 251.

The selected control signal is outputted from the second selecting portion 252 to the second bypass valve 43.

Next, a control in starting the power generating equipment 201 constituting a characteristic of the embodiment will be explained.

Further, although in starting, the feedback control portion 51 and the second surging control portion 251 respectively output the control signals by calculating the opening degree of the second bypass valve 43, calculation of the opening of the second bypass valve 43 by the feedback control portion 51 or the like is similar to that in the case of the first embodiment, and therefore, an explanation thereof will be omitted.

Further, power generation at the power generating equipment 201 is similar to power generation according to the first embodiment, and therefore, an explanation thereof will be omitted.

Figure 11:
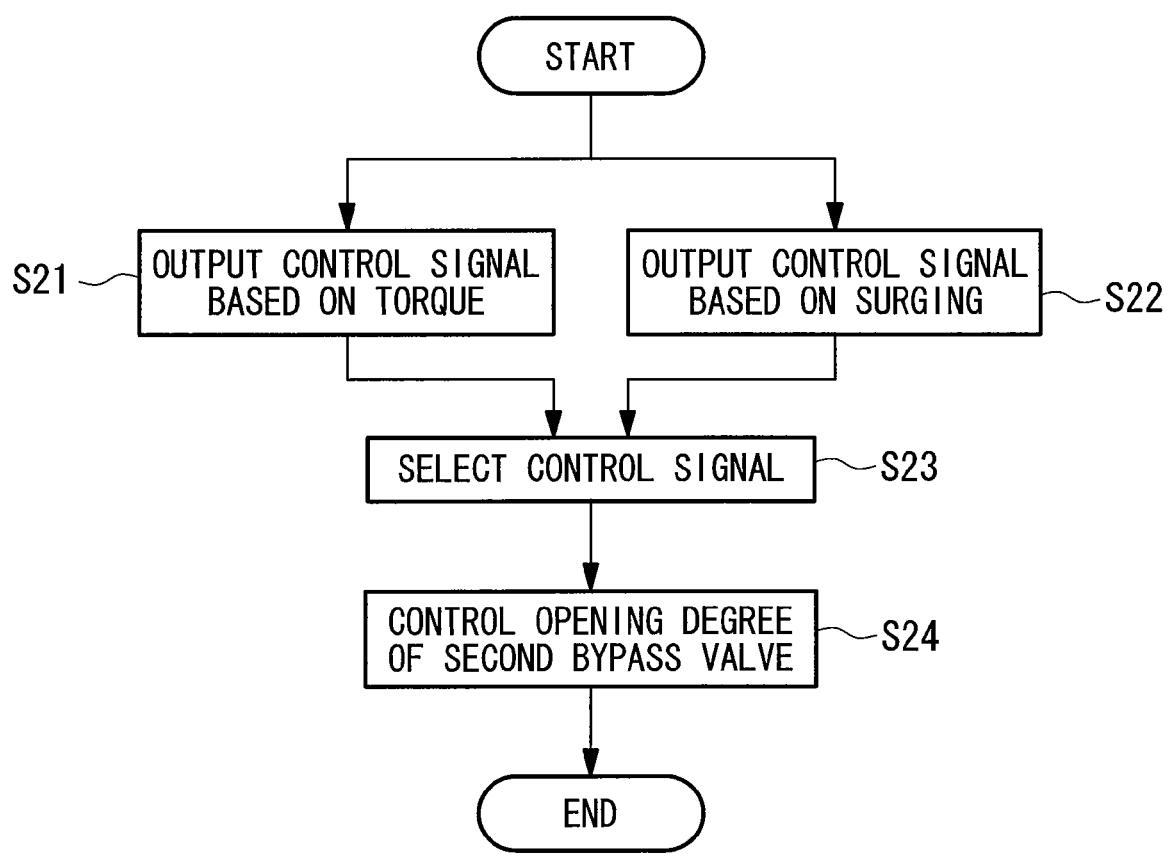
FIG. 11 is a flowchart for explaining a control in starting the power generating equipment of FIG. 10.

FIG. 11 is a flowchart for explaining a control in starting the power generating equipment of FIG. 10.

In starting the power generating equipment 201, as shown by FIG. 11, calculation of the bypass flow rate in the feedback control portion 51, and calculation of the opening degree V2 of the second bypass valve 43 (step S21 (first calculating step)), and calculation of the bypass flow rate at the second surging control portion 251, and calculation of the opening degree V2 of the second bypass valve 43 (step S22 (second calculating step)) are executed independently from each other.

As shown by FIG. 10, the second surging control portion 251 of the control portion 250 is inputted with the pressure ratio of the working fluid on the suction side and the delivery side of the high pressure compressor 5 is inputted from the second pressure ratio measuring portion 261, and the corrected revolution number N1 is inputted from the corrected revolution number calculating portion 263.

The second surging portion 251 calculates the suction flow rate for preventing surging of the high pressure compressor 5 from being brought about based on the inputted pressure ratio and the inputted corrected revolution number N1. The flow rate for preventing surging from being brought about in the second surging control portion 251 is calculated based on a table or the like stored previously to the second surging control portion 251.

The second surging control portion 251 further calculates the opening degree V2 of the second bypass valve 43 based on the calculated suction flow rate and outputs the control signal of controlling the opening degree of the second bypass valve 43 to the second selecting portion 252.

As shown by FIG. 10, the second selecting portion 252 is inputted with the control signal of controlling the opening degree V2 of the second bypass valve 43 from the second surging control portion 251 and inputted with a control signal of controlling the opening degree V2 of the second bypass valve 43 also from the feedback control portion 51.

The second selecting portion 252 selects the control signal having the larger opening degree of the second bypass valve 43 from the inputted control signals and outputs the selected control signal to the second bypass valve 43 (step S23 (selecting step)).

At the second bypass valve 43, the opening degree V2 is controlled based on the inputted control signal and the flow rate of the working fluid flowing to the second bypass valve 32 is controlled (step S24 (flow rate controlling step)).

According to the above-described constitution, by selecting the bypass flow rate having a larger flow rate from the bypass flow rate of controlling the torque applied to the speed reduction gear portion 6 to the target torque −Q and the bypass flow rate for preventing surging from being brought about in the high pressure compressor 5, the flow rate of the bypassed working fluid is controlled to the selected bypass flow rate, and therefore, not only the torque applied to the speed reduction gear portion 6 can be prevented from being smaller than the target torque −Q but surging can be prevented from being brought about in the high pressure compressor 5.

Particularly, even when there is brought about a situation in which surging is liable to be brought about in the high pressure compressor 5 by a disturbance, surging of the high pressure compressor 5 can be prevented from being brought about.

Fourth Embodiment

Next, a fourth embodiment of the invention will be explained in reference to FIG. 12 through FIG. 14.

Although a basic constitution of a power generating equipment of the embodiment is similar to that of the third embodiment, the embodiment differs from the first embodiment in a method of controlling the first bypass valve. Therefore, according to the embodiment, only the method of controlling the first bypass valve will be explained in reference to FIG. 12 through FIG. 14, an explanation of other constituent element or the like will be omitted.

Figure 12:
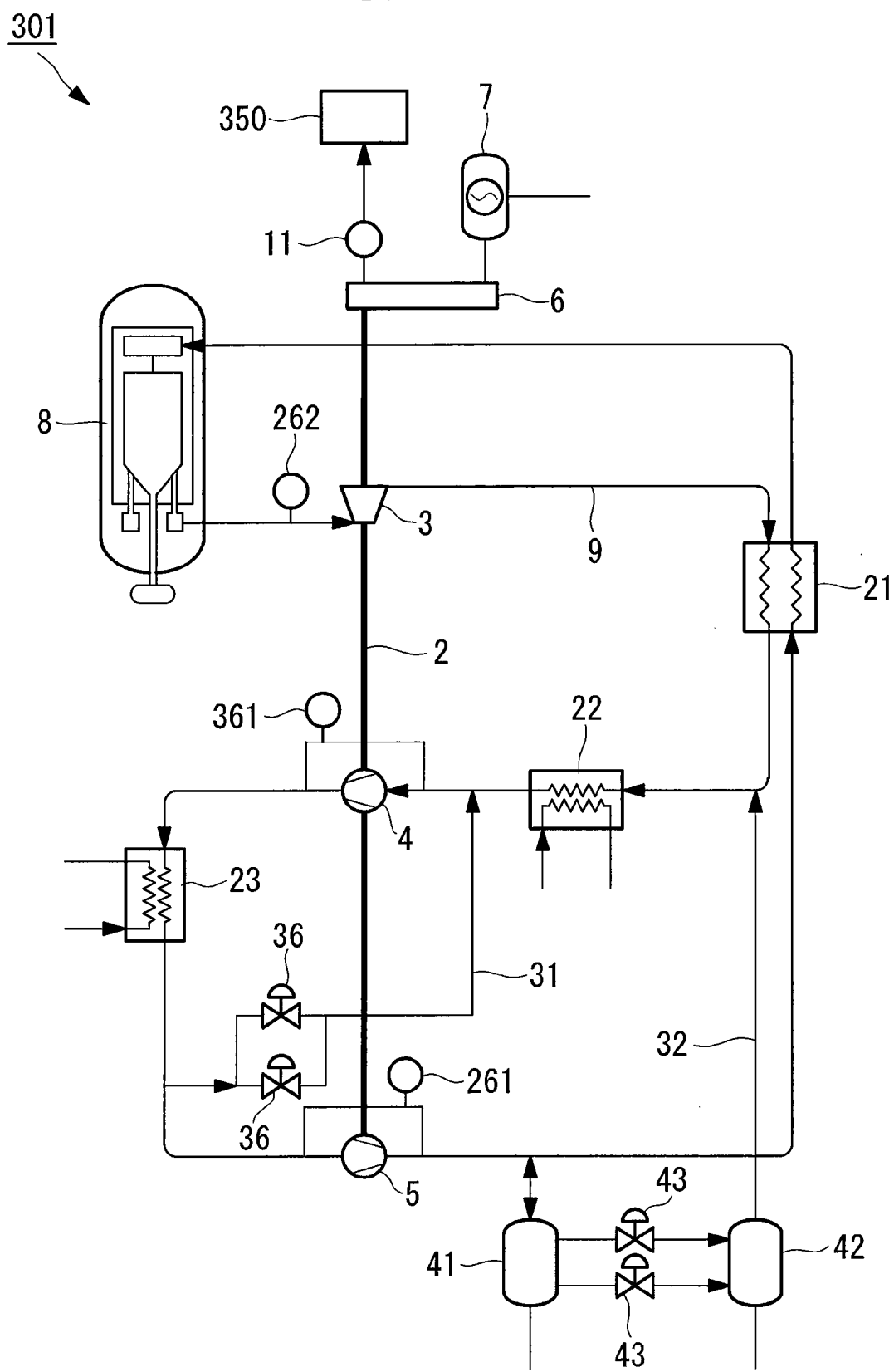
FIG. 12 is a schematic view for explaining a constitution of a power generating equipment according to a fourth embodiment of the invention.

FIG. 12 is a schematic view for explaining a constitution of the power generating equipment according to the embodiment. FIG. 13 is a block diagram for explaining a control of the power generating equipment of FIG. 12.

Further, constituent elements the same as those of the third embodiment are attached with the same notations and an explanation thereof will be omitted.

Figure 13:
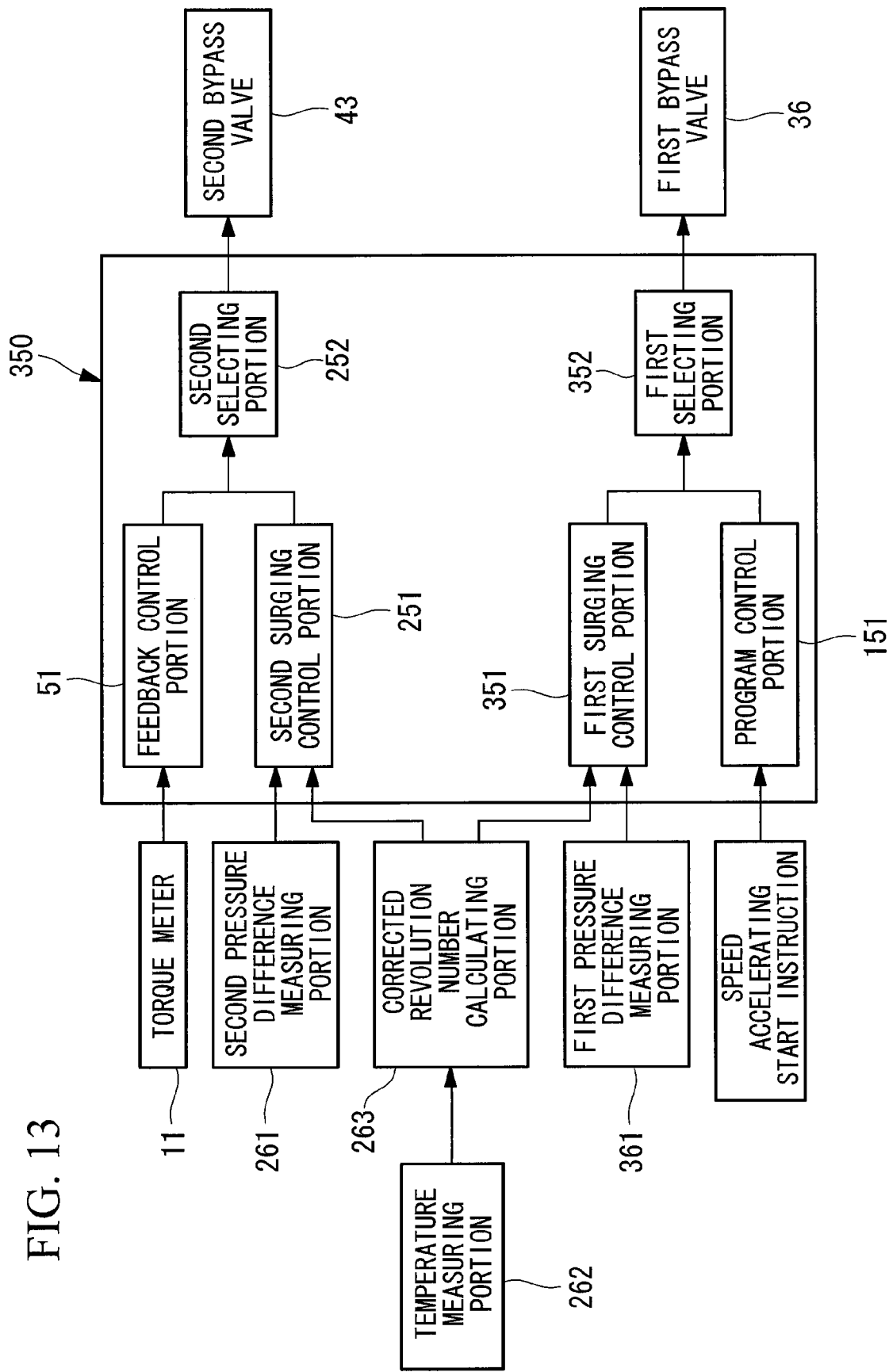
FIG. 13 is a block diagram for explaining a control of the power generating equipment of FIG. 12.

As shown by FIG. 12 and FIG. 13, the power generating equipment 301 of the embodiment is further provided with a first pressure ratio measuring portion 361 for measuring a pressure ratio of a working fluid pressure on a suction side and a working fluid pressure of a delivery side of the low pressure compressor 4.

As shown by FIG. 12, the first pressure ratio measuring portion 361 is a measuring portion for measuring a ratio of a pressure of the working fluid sucked to the low pressure compressor 4 and a pressure of the working fluid delivered from the low pressure compressor 4. As shown by FIG. 13, the pressure ratio measured by the first pressure ratio measuring portion 361 is inputted to a first surging control portion 351 of a control portion 350.

Further, as shown by FIG. 12, the control portion 350 of the power generating equipment 301 of the embodiment is provided with the program control portion 151 for controlling the opening degree V1 of the first bypass valve 36 based on the torque measured by the torque meter 11, the first surging control portion (control portion) 351 for controlling the opening degree V1 of the first bypass valve 36 by calculating the suction flow rate for preventing surging of the low pressure compressor 4 from being brought about, and a first selecting portion 352 for selecting a control signal having a larger opening degree of the first bypass valve from control signals outputted from the program control portion 151 and the first surging control portion 351.

As shown by FIG. 12, the first surging control portion 351 calculates a suction flow rate for preventing surging of the low pressure compressor 4 from being brought about based on the pressure ratio inputted from the first pressure ratio measuring portion 361 and the modified revolution number N1 inputted from the modified revolution number calculating portion 263, calculates the opening degree V1 of the first bypass valve 36 based on the calculated suction flow rate and outputs the control signal for controlling the opening degree.

The control signal outputted from the first surging control portion 351 is inputted to the first selecting portion 352.

Here, the calculated suction flow rate for preventing surging from being brought about is a flow rate of adding a predetermined allowance (margin) to the suction flow rate for bringing about surging at the low pressure compressor 4. Therefore, the calculated opening degree V1 of the first bypass valve 36 is an opening degree by which the working fluid of the flow rate added with the above-described margin flows to the low pressure compressor 4.

As shown by FIG. 12, the first selecting portion 352 selects the control signal having the larger opening degree of the opening degrees V1 of the first bypass valve 36 applied to the control signal inputted from the program control portion 151 and the control signal inputted from the first surging control portion 351.

The selected control signal is outputted from the first selecting portion 352 to the first bypass valve 36.

Next, a control in starting the power generating equipment 301 constituting a characteristic of the embodiment will be explained.

In starting the power generating equipment 301, similar to the third embodiment, the second selecting portion 252 is inputted with signals for controlling the opening degree V2 of the second bypass valve 43 from the feedback control portion 51 and the second surging control portion 251 and the control signal selected by the second selecting portion 252 is inputted to the second bypass valve 43.

Figure 14:
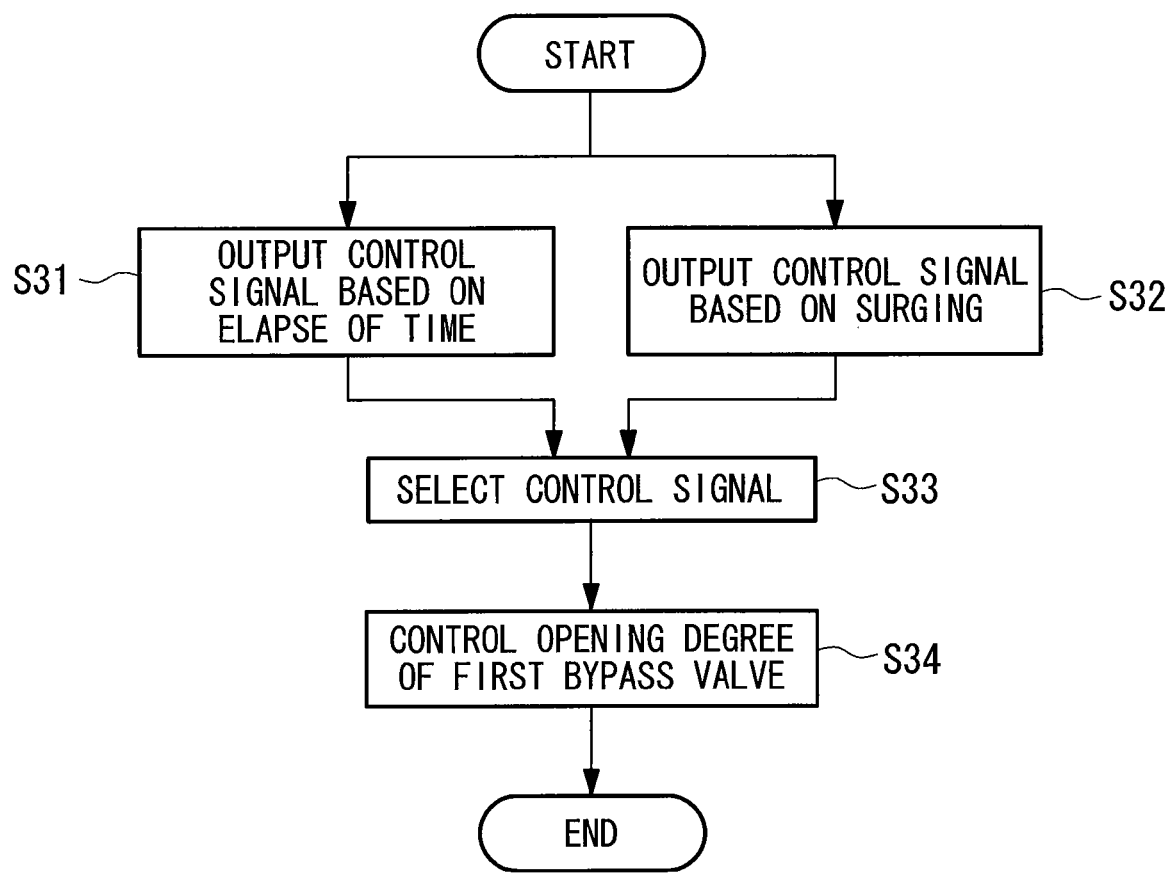
FIG. 14 is a flowchart for explaining a control in starting the power generating equipment of FIG. 12.

FIG. 14 is a flowchart for explaining the control in starting the power generating equipment of FIG. 12.

Simultaneously with the control of the opening degree of the second bypass valve 43, as shown by FIG. 14, calculation of the bypass flow rate at the program control portion 151, and calculation of the opening degree of the first bypass valve 36 (step S31 (first calculating step)), and calculation of the bypass flow rate at the first surging control portion 351, and calculation of the opening degree of the first bypass valve 36 (step S32 (second calculating step)) are executed independently from each other.

As shown by FIG. 13, the first surging control portion 351 of the control portion 350 is inputted with the pressure ratio of the working fluid on the suction side and on the delivery side of the low pressure compressor 4 from the first pressure ratio measuring portion 361 and inputted with the corrected revolution number N1 from the corrected revolution number calculating portion 263.

The first surging control portion 351 calculates the suction flow rate for preventing the surging of the low pressure compressor 4 from being brought about based on the inputted pressure ratio and the inputted corrected revolution number N1. The flow rate for preventing surging from being brought about in the first surging control portion 351 is calculated based on a table or the like previously stored to the first surging control portion 351.

The first surging control portion 351 calculates the opening degree V1 of the first bypass valve 36 based on a calculated suction flow rate and outputs the control signal of controlling the opening degree of the first bypass valve 36 to the first selecting portion 352.

As shown by FIG. 13, the first selecting portion 352 is inputted with the control signal of controlling the opening degree V1 of the first bypass valve 36 from the first surging control portion 351 and inputted with the control signal of controlling the opening degree V1 of the first bypass valve 36 also from the program control portion 151.

The first selecting portion 352 selects the control signal having the larger opening degree of the first bypass valve 36 and outputs the selected control signal to the first bypass valve 36 (step S33 (selecting step)).

At the first bypass valve 36, the opening degree is controlled based on the inputted control signal and the flow rate of the working fluid flowing through the first bypass flow path 31 is controlled (step S34 (flow rate controlling step)).

According to the above-described constitution, the bypass flow rate having the larger flow rate is selected from the bypass flow rate based on an elapsed time period after starting to increase the revolution number of the low pressure compressor 4 or the like and the bypass flow rate for preventing surging of the low pressure compressor 4 from being about, the flow rate of the bypass working fluid is controlled to the selected flow rate, and therefore, not only the torque applied to the speed reduction gear portion 6 can be prevented from becoming lower than the target torque −Q but surging of the low pressure compressor 4 can be prevented from being brought about.

Particularly, surging of the low pressure compressor 4 can be prevented from being brought about even when there is brought about a situation in which surging of the low pressure compressor 4 is easy to be brought about by a disturbance.

Further, the technical range of the invention is not limited to the above-described embodiments but can variously be modified within the range not deviated from the gist of the invention.

For example, although according to the above-described embodiments, an explanation has been given by applying the invention to the example of controlling the second bypass valve 43 by the feedback control portion 51 and controlling the first bypass valve 36 by the program control portion 151, conversely, the first bypass valve 36 may be controlled by the feedback control portion 51, the second bypass valve 43 may be controlled by the control portion 151 and the invention is not limited thereto.

The invention claimed is:

1. A turbine equipment, comprising:
a compressor for compressing a working fluid;
a turbine driven to rotate by the working fluid;

a circulating flow path for circulating the working fluid at least between the compressor and the turbine;

a bypass flow path for bypassing the working fluid from a delivery side to a suction side of the compressor;

a bypass valve for controlling a flow rate of the working fluid flowing through the bypass flow path;

a motor for driving to rotate the compressor and the turbine by way of a speed reducing portion in starting; and a controller configured to control the turbine equipment by controlling the motor to increase a rotational speed by driving to rotate the compressor and the turbine by way of the speed reducing portion;

receiving a signal from a load detector configured to detect a load applied to the speed reducing portion; and controlling the bypass valve, wherein the controller controlling the bypass valve includes calculating a bypass flow rate based on the detected load and a predetermined value;

calculating a bypass flow rate which will prevent surging of the compressor from being brought about based on a pressure ratio between the suction side and the delivery side of the compressor, and a corrected rotational speed of the compressor calculated based on a temperature of the working fluid delivered to the turbine;

selecting the bypass flow rate having a larger flow rate from the bypass flow rates calculated by the calculating steps; and controlling the bypass valve to increase a flow rate of the working fluid bypassed from the delivery side to the suction side of the compressor when an absolute value of the detected load is equal to or smaller than an absolute value of the predetermined value and reducing the flow rate of the bypassed working fluid when the absolute value of the load is equal to or larger than the absolute value of the predetermined value, but ensuring that the flow rate of the bypassed working fluid does not decrease below the selected bypass flow rate to thereby prevent surging of the compressor.

2. A turbine equipment as claimed in claim 1, wherein the compressor is a low pressure compressor and the bypass flow path is a first bypass flow path in which a first bypass valve is mounted and is configured to bypass working fluid from the delivery side to the suction side of the low pressure compressor, the turbine equipment further including a high pressure compressor.

3. A turbine equipment as claimed in claim 2, further comprising a second bypass flow path in which a second bypass valve is mounted, the second bypass flow valve being configured to bypass working fluid from a delivery side of the high pressure compressor to the suction side of the low pressure compressor.

4. A turbine equipment as claimed in claim 2, wherein the low pressure compressor, the high pressure compressor and the turbine are mounted on a common shaft to which the motor is drivingly connected through the speed reducing portion.

5. A method of controlling a turbine equipment during starting, the turbine equipment including a compressor for compressing a working fluid, a turbine driven to rotate by the working fluid, a circulating flow path for circulating the working fluid at least between the compressor and the turbine, a bypass flow path for bypassing the working fluid from a delivery side to a suction side of the compressor, a bypass valve for controlling a flow rate of the working fluid flowing through the bypass flow path, a motor for driving to rotate the compressor and the turbine by way of a speed reducing portion in starting and a controller configured to control the turbine equipment, the method including:

controlling the motor by increasing the rotational speed of the motor which increases the rotational speed of the compressor and turbine by driving the compressor and the turbine by way of the speed reducing portion;

receiving a signal from a load detector configured to detect a load applied to the speed reducing portion;

calculating a bypass flow rate based on the detected load and a predetermined value;

calculating a bypass flow rate which will prevent surging of the compressor from being brought about based on a pressure ratio between the suction side and the delivery side of the compressor, and a corrected rotational speed of the compressor calculated based on a temperature of the working fluid delivered to the turbine;

selecting the bypass flow rate having a larger flow rate from the bypass flow rates calculated by the calculating steps and controlling the operation of the bypass valve to open the valve to increase a flow rate of the working fluid bypassed from the delivery side to the suction side of the compressor when an absolute value of the detected load is equal to a smaller than absolute value of the predetermined value and reducing the flow rate of the bypassed working fluid by closing the valve when the absolute value of the load is equal to or larger than the absolute value of the predetermined value, but ensuring that the flow rate of the bypassed working fluid does not decrease below the selected bypass flow rate to thereby prevent surging of the compressor.

6. A method as claimed in claim 5, in which the predetermined value of the load is selected to reduce the risk of damage to the speed reducing portion which could occur under low load conditions.

* * * * *